March 14, 1944.    F. J. PEPERSACK    2,344,056
DRAIN VALVE TANK FITTING
Filed Feb. 27, 1942
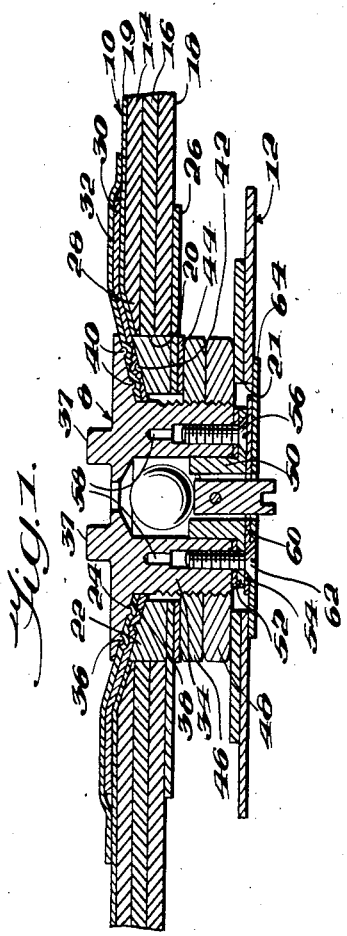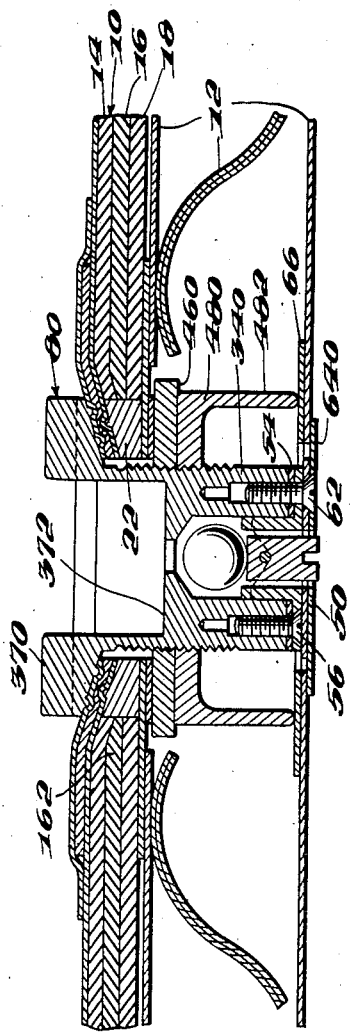
Inventor
FRANCIS J. PEPERSACK,
By George Douglas Jones.
Attorney Patented Mar. 14, 1944

2,344,056

UNITED STATES PATENT OFFICE 2,344,056

DRAIN VALVE TANK FITTING

Francis J. Pepersack, Towson, Md., assignor to The Glenn L. Martin Company, Middle River, Md., a corporation of Maryland Application February 27, 1942, Serial No. 432,699

6 Claims. (Cl. 285—49)

This invention relates to drain valve fittings for cellular tanks and more particularly for tanks adapted to contain liquid fuel and including a pliant cell within a rigid housing. Tanks of this nature are used as containers for fuel or oil in airplanes, in which case they may be fitted into the fuselage or wing structure and rigidly confined thereby.

The present application is a continuation-in-part of patent application Serial No. 423,646, filed December 19, 1941, now Patent No. 2,321,417, issued June 8, 1943, for improvements in "Fitting construction for tanks."

While described in connection with aircraft, the cellular form of tank and the valve fitting to be disclosed in detail are applicable to other kinds of transport vehicles, including ships.

In the first place it is intended that the fitting of this invention shall improve certain features and give additional utility to the embodiments disclosed in the earlier application. It was proposed in that application to reinforce the opening in the rigid housing structure with the fitting, and to protect the cell material around its opening with a non-compressible ring to co-operate with the fitting and to prevent it from compressing the cell material. When the cell elements of these tanks are composed of rubber-like material, continued compression between an ordinary fitting will cause cold flow and result in serious impairment of the material.

One of the objects of this invention is to improve the gripping action between the clamping portions of the fitting and the non-compressible ring by providing an extended surface on one face of the ring.

Another object of the invention resides in the provision of means for detachably securing the fitting about the opening of the rigid tank structure and closing that opening.

An additional object is to provide a fitting of the character described with means for supporting the inner side of the structure adjacent its opening and clamping the fitting to the cell.

Other novel details of construction and arrangement of parts contributing to the efficiency and utility of the valve fitting and tank construction of this invention will be indicated in connection with the following detailed description of a preferred embodiment and a modification, taken in connection with the accompanying drawing, in which Fig. 1 represents a partial vertical section of a tank cell, housing structure and valve fitting; and Fig. 2 shows by way of a similar vertical section a modified form of valve fitting mounted on a tank cell and housing structure.

Referring now in detail to Fig. 1, a drain valve 8 is clamped upon a pliant cell 10 of rubber-like material and secured to a rigid structure 12 which houses the cell.

The illustrated cell 10 is of the self-sealing variety and includes an inner layer 14, an intermediate sealant layer 16, and an outer layer 18, comprising a three-ply lamination subject to cold flow under pressure. In particular, the inner layer 14 will preferably be of a synthetic rubber, because of the resistance of this form of rubber to attack by liquid hydrocarbon fuels. Crude unvulcanized rubber is used for the intermediate layer 16 to provide a sealing action and prevent leakage following bullet penetration. The outer protective layer 18 which is adjacent the housing structure 12 is by preference formed of soft vulcanized rubber. Note should also be made of an inner reinforcing layer or lining 19 which covers the liquid side of the cell and is particularly resistant to the destructive action of liquid hydrocarbons.

An opening 20 extends through the three rubber-like layers of the cell 10 in alignment with a larger opening 21 formed in the metallic frame structure 12 for receiving the valve fitting.

The details of the drain valve 8 insofar as its specific valve functions are concerned is not an essential part of this application. It will be sufficient to note that the valve structure illustrated is adapted to permit fluid flow from within the cell 10 and through the valve when open and that the check member is held seated when the valve is closed. Other forms of valve means capable of these general functions are well-known and may obviously be employed.

A rigid ring or tubing 22 is closely fitted within the opening 20 through cell layers 14, 16, and 18, and has an overall thickness appreciably less than that of the abutting cell layers in unstressed condition. This ring 22 is preferably formed from a phenolic condensate material such as Bakelite and has a special shape for purposes to be described.

The upper or inner face 24 of ring 22 is centrally and downwardly inclined so that its widest peripheral surface is outermost, because this will extend its contact surface without otherwise increasing its size and result in a saving of material.

The inward and outward inclination of the inner face 24 of ring 22 is of further importance for the reason that it reduces inward projection and permits the drain valve 8 to be positioned below the inside of the tank cell 10, thus insuring maximum drainage.

A heavy fabric reinforcing member 26 of circular, washer shape forms an aligned continuation of the opening of ring 22 and spans the juncture of cell opening 20 and the outer edge of ring 22 to seal the same. The reinforcing member 26 may be of a heavy fabric impregnated with synthetic rubber and is adhesively secured to the flush outer faces of cell 10 and ring 22.

On the inner side of cell 10 the layer 14 has a tapered edge 28 produced by compression at the opening 20, which edge forms a continuation of the tapered face of ring 22 when covered with the inner lining layer 19. A cell opening reinforcing member 30, similar in most respects to the opposite member 26, is likewise adhesively secured to the inner faces of cell 10 and ring 22 with a slight marginal extension over the opening of ring 22. The reinforcing member 30 is protected by a seam cover 32 which is coextensive with the member 30 except for a substantial overlapping at its outer periphery. The contacting surfaces of the inner reinforcing member 30 and cell lining layer 19 are adhesively joined to the seam cover 32.

The drain valve 8 includes an externally threaded valve housing 34 extending within the aligned openings 20 and 21 of the cell and housing structure respectively. On the end within the tank cell 10 the valve housing 34 is provided with an external shoulder or flange 36 and, for assembling, valve holding lugs 37, 37, the flange being substantially flush with the inside of cell 10. The flange 36 has a tapered clamping face 38 covering and parallel to the upper or inner face 24 of the non-deformable ring 22. It will be observed that a pair of circumferential ridges 40, 40 project from the clamping face 38 and engage the underlying portion of the seam cover 32. An intermediately disposed ridge 42 on the inclined face of ring 22 cooperates to frictionally lock the inner reinforcing and sealing layers for the opening of tank cell 10.

On the outer side of the cell 10 a metal washer 44 extends around and provides a continuation of the opening through ring 22. The washer 44 has the transverse width of the annular part of ring 22 and engages the adjacent cell opening reinforcing member 26 to protect the latter. Clamping means in the form of a nut 46 threaded onto the valve housing 34 and a companion lock nut 48 are of a size and shape to hold the sealed ring 22 in tight engagement with the inner flange 36 of the valve housing.

A valve plunger sleeve 50 extends inwardly of the valve housing 34 and has a thin abutment flange 52 on its outer end, which flange is spaced from the valve housing 34 by a thin gasket 54. A circumferentially spaced series of flat head retaining screws 56 pass through the abutment flange 52 and gasket 54 to engage corresponding tapped holes 58 extending longitudinally of the valve housing 34. A washer 60 having an opening of the same size as the valve plunger sleeve 50 covers the retaining screws 56 and is, in turn, clamped by the action of another series of circumferentially spaced screws 62 extending through an outer cover assembly 64, the washer 60, flange 52, washer 54, and into appropriately spaced tapped holes 58. The screws 62 may be suitably retained as by conical lock washers.

The cover assembly 64 extends beyond the edges of the opening 21 in the rigid housing 12 and clamps the underlying portions of that housing and a structure spacing and stiffening ring 66 to the outer nut 48 engaging the threaded valve housing 34. It will also be noted that the relative thinness of the cover assembly 64 is such that it will fair the end of the drain valve 8 which it covers and acts as means for hanging the cellular tank to its rigid housing 12.

The drain valve fitting of Fig. 2 is similar to that of Fig. 1 in most respects and, for this reason, only the differences in this modification will be emphasized. In the modification, restricted compression of the tank cell 10 has resulted in a thinning of the peripheral edge of cell layer 16, as indicated at 162. In Fig. 2, the modified form of drain valve is indicated generally as 80 and includes an externally threaded valve housing 340 as before. The drain valve 80 is, however, characterized by a plurality of more widely separated valve holding means or lugs 370 around a central well 372 which serves to position the valve opening outwardly of the tank cell 10. For maximum drainage the well 372 is made to extend through the cell 10 to lower the inlet to the drain valve 80.

Further note is made that the tank cell 10 is clamped to the drain valve 80 through its sealed rigid ring 22 and by means of a threaded ring or nut 460 on the valve housing 34. In place of a simple lock nut, a cup-shaped member 480 is threaded over the valve housing 340 into locking engagement with the ring 460. The member 480 has an outwardly extending vertical wall 482 surrounding the valve housing 340 in well-spaced relation.

Valve cover assembly 640 is disposed and secured in the manner previously indicated, but acts to clamp the housing 12 and its stiffening ring 66 to the outer end of the wall portion 482 which is of appreciably larger diameter than the cover assembly.

One of the advantages of the modified form of fitting is that it provides additional space between the rigid housing 12 and the tank cell 10, where that is required, and permits one of the cell clamping means to serve as a rigid spacer by the addition thereto of the wall 482.

It is believed that the manner of assembly and operation of the fittings of this invention will be fully understood from the previous disclosures of their details of construction. In most instances, the valve housing and its associated clamping means will be formed from a good grade of corrosion-resisting metal, but it will be appreciated that any sufficiently rigid and strong material which is resistant to corrosion can be substituted if desired. The tank cell and its opening reinforcement are not necessarily limited to a multiple layer wall or the particular materials preferred for the reinforcing of its opening, since there are a variety of others which will serve.

The preferably plastic ring 22 may be made round, rectangular, or of any other shape, according to the housing structure opening and the form of the fitting. Therefore, "ring" must be taken to include these other enclosing shapes.

The several embodiments of the invention which have been specifically disclosed herein will suggest numerous changes which may be made in the details of construction and arrangement of parts without departing from the spirit of the invention and the scope of the appended claims.

Having thus described the invention, what is claimed as new and desired to be secured by Letters Patent of the United States is:

1. In combination with a liquid fuel or lubricant tank cell comprising one or more layers of rubber-like material subject to cold flow and having an opening through the wall thereof, a relatively undeformable ring closely fitted within the cell opening and sealed thereto, the outer peripheral face of the ring having a width appreciably less than the unstressed thickness of the adjacent rubber-like cell material, and one of the end faces of the ring being centrally inclined to a narrower inner peripheral face; a valve housing extending through the opening of the tank cell, the valve housing having an outwardly extending flange; and a detachable member secured to the valve housing in spaced relation to its flange, the flange of the valve housing and the detachable member being complemental to the respective adjacent end faces of the ring and formed and arranged to exert clamping pressure thereon.

2. In combination with a liquid fuel or lubricant tank cell comprising one or more layers of rubber-like material subject to cold flow and having an opening through the wall thereof, a relatively undeformable ring closely fitted within the cell opening and sealed thereto, the outer peripheral surface of the ring having a width less than the unstressed thickness of the adjacent rubber-like cell material, and the inner face of the ring being centrally and outwardly inclined; a valve housing extending through the opening of the tank cell, the valve housing having a flange with a sloping face adjacent and extending parallel to the inclined inner face of the ring, whereby to lower the valve housing below the inner surface of the tank cell; and detachable means secured to the valve housing in spaced relation to its flange, the flange of the valve housing and the detachable means being formed and arranged to exert clamping pressure on the face areas of the ring.

3. In combination with a liquid fuel or lubricant tank cell comprising one or more layers of rubber-like material subject to cold flow and having an opening through the wall thereof and a rigid structure confining said container cell and provided with an opening in alignment with that of the tank cell, a relatively undeformable ring closely fitted within the cell opening and sealed thereto, the outer peripheral face of the ring having a width less than the unstressed thickness of the adjacent rubber-like cell material, and the inner face of the ring being centrally and outwardly inclined; a valve housing extending through the opening of the tank cell, the valve housing having a flange with a sloping face adjacent and extending parallel to the inclined inner face of the ring; detachable means secured to the valve housing in spaced relation to its flange, the flange of the valve housing and the detachable means being formed and arranged to exert clamping pressure on the face areas of the ring; and a cover assembly engaging the outer sides of the rigid structure, extending over its opening and detachably secured to the adjacent end of the valve housing.

4. In combination with a liquid fuel or lubricant tank cell comprising one or more layers of rubber-like material subject to cold flow and having an opening through the wall thereof and a rigid structure confining said container cell and provided with an opening in alignment with that of the tank cell, a relatively undeformable ring closely fitted within the cell opening and sealed thereto, the outer peripheral face of the ring having a width less than the unstressed thickness of the adjacent rubber-like cell material, and the inner face of the ring being centrally and outwardly inclined; a valve housing extending through the opening of the tank cell, the valve housing having a flange with a sloping face adjacent and extending parallel to the inclined inner face of the ring; detachable means secured to the valve housing in spaced relation to its flange, the flange of the valve housing and the detachable means being formed and arranged to exert clamping pressure on the face areas of the ring, and a portion of the detachable means being formed to provide a wall surrounding the outer end of the valve housing in spaced relation to support the rigid structure adjacent its opening; and a cover assembly extending over the opening in the rigid structure and detachably secured to the adjacent end of the valve housing to clamp the rigid structure against the end of the wall of the detachable means and spaced from the tank cell.

5. In combination with a liquid fuel or lubricant tank cell comprising one or more layers of rubber-like material subject to cold flow and having an opening through the wall thereof, a relatively undeformable ring closely fitted within the cell opening and sealed thereto, the outer peripheral surface of the ring having a width less than the unstressed thickness of the adjacent rubber-like cell material, and the inner face of the ring being centrally and outwardly inclined; a drain valve housing extending through the opening of the tank cell, the drain valve housing having on one end a flange substantially flush with the inside of the cell and provided with a sloping face adjacent and extending parallel to the inclined inner face of the ring; and detachable means secured to the drain valve housing in spaced relation to its flange, the flange of the drain valve housing and the detachable means being formed and arranged to exert clamping pressure on the face areas of the ring.

6. The combination of claim 5 in which the drain valve housing is formed to provide a central well extending through the tank cell and communicating with the drain valve inlet outside said tank cell.

FRANCIS J. PEPERSACK.